UNITED STATES PATENT OFFICE.

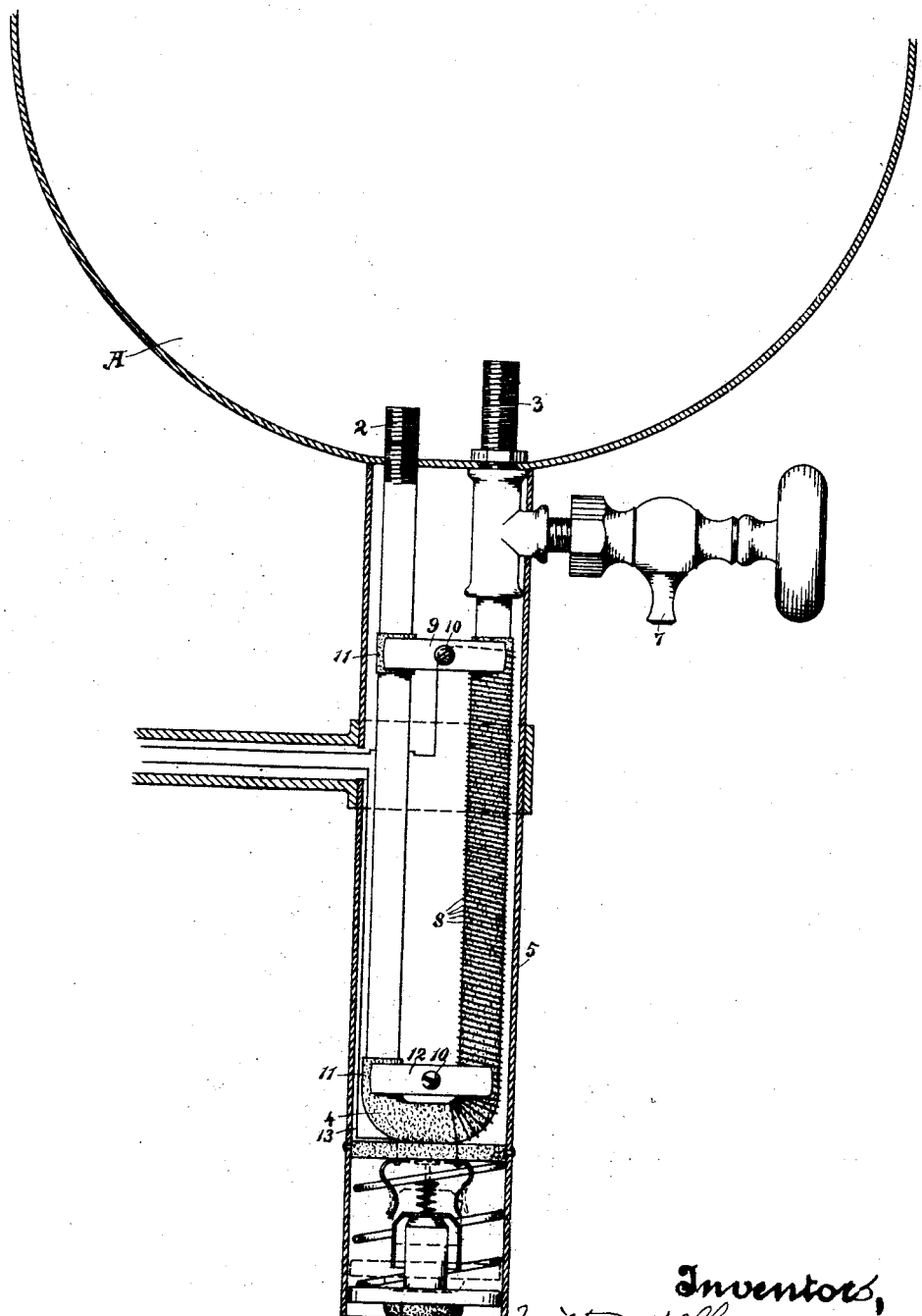

MILTON H. SHOENBERG AND HENRI LEVY, OF SAN FRANCISCO, CALIFORNIA.

ELECTRIC WATER-HEATER.

SPECIFICATION forming part of Letters Patent No. 696,599, dated April 1, 1902.

Application filed April 10, 1901. Serial No. 55,146. (No model.)

*To all whom it may concern:*

Be it known that we, MILTON H. SHOENBERG and HENRI LEVY, citizens of the United States, residing in the city and county of San Francisco, State of California, have invented an Improvement in Electric Water-Heaters; and we hereby declare the following to be a full, clear, and exact description of the same.

Our invention relates to an apparatus which is especially designed for the rapid and continuous heating of flowing water; and it consists in a circulating apparatus, means for supplying the water thereto, means for electrically heating the current passing through the supply-tube, means for continuously drawing off the flowing and heated water, and a reservoir connected with the apparatus in which a quantity may be stored when not being drawn.

The invention further comprises details of construction which will be more fully explained by reference to the accompanying drawing, in which the figure is a vertical section through the heater.

The object of our invention is to provide a means for heating bodies of water either to be stored by circulating the water continuously through the storage vessel or to heat the water as it flows from the source of supply to the discharge, so that a continuous stream of hot water can be drawn.

As illustrated in the present drawing, A is a reservoir for containing a supply of water, and it may be made of any suitable form or size. Through the bottom of this reservoir extend the pipes 2 and 3, which are united by a U-shaped coupling at the bottom, as at 4, and these pipes and connected parts may be contained in an exterior inclosing case, as 5. One of the pipes 3 in this construction is made longer than the other, extending to a corresponding greater height into the vessel A, so that when water is heated in the pipe 3 it rises toward the upper part of the vessel, and the cooler water within the vessel will pass down through the pipe 2, thus keeping up a constant circulation. This illustrates a very satisfactory form of the device; but it will be manifest that the pipes may be otherwise arranged and connected in any manner to produce a constant circulation of water through the pipes and chamber.

A discharge-cock 7 connects with the pipe 3 below the reservoir A, and when it is desired to draw the water continuously by opening this cock while the heating device is in operation the water may be drawn through the cock without circulating through the chamber, the water in this case entering through the supply-pipe, passing through the pipes 2 and 3, where it is subjected to the action of the heater, and thence passing out through the discharge.

The heating device consists of a wire 8 of small diameter, which is wound in coils about the pipe 3, the latter being covered with an insulating-coating of mica or other equivalent insulating substance. This wire is made fine, so as to provide for a high resistance to the electrical current which is passed through it, and this produces such a degree of heat as will heat the water during its passage through the portion of the pipe which is surrounded by the heating-coil. We are thus enabled to make the coil fine and of high resistance without danger of burning it out or heating it to a red or other undue heat, because the coil is in close contact with the water-pipe, and its temperature can never be raised very much above that of the flowing water by any electrical current which can be passed through it. We prefer to wind this portion of the tube with a single coil of wire, the upper end of which is secured by a screw-clamp 9, between which and the insulated tube 3 the upper end of the wire is secured by means of a screw, as at 10, the other end of the bars forming the clamp clasping the pipe 2 and are insulated therefrom by mica or other insulating material, as at 11. The lower end of the wire is correspondingly secured in place by a similar pair of screw-clamps 12, between which and the insulation of the tube 3 the lower end of the wire is clamped, and the other ends of the clamping-bars clasp the tube 2 with a similar insulating material 11, interposed, as shown, at the upper portion. The electrical connection being made substantially as shown, the current will pass through the coil 8, and thus heat the apparatus, as before stated.

Having thus described our invention, what we claim as new, and desire to secure by Letters Patent, is—

1. The combination in an electrical heater of a pipe having legs of unequal length one of said legs serving as a water-inlet and the other as a water-outlet said outlet having a controlling-cock; an exterior insulation for said pipe; a coil of wire having high resistance, wound in contact with the insulating-surface; clamps extending between the legs of the pipe, having one end to secure the ends of the coil against the insulating-surface and the other end extending to and clamped against and insulated from the opposite leg of the coil; and electrical connections with the coil.

2. An electrical water-heater, consisting of a pipe, an insulating inclosing material, a single coil of high-resistance wire, wound in contact with the insulating-covered pipe, a supply through which water is delivered into one end of said pipe, and a controlled discharge from the opposite end, clamps, one end of which secures the ends of the coil against the insulating-surface, the opposite ends clamping the supply-pipe and having an insulating material between them and the supply-pipe screws by which said clamps are fixed or loosened, an electrical connection with the coil whereby an electrical current of high tension is passed through the coil, and the latter protected by the water-conducting pipe which it incloses.

3. The combination in an electrical heater of a reservoir, a U-shaped pipe having legs of unequal length, the open ends of which connect with the interior of the reservoir, one above the other, an insulating-covering for the longer arm, a coil of high resistance wound in contact with said covering and inclosing the pipe, plates extending between the legs of the pipe and having opposite ends insulated therefrom one of said ends securing the ends of the coil, and screws engaging the plates between their ends, and electrical connections through which an electrical circuit is established through the coil whereby a circulation of water is produced within the coil and reservoir, and a discharge-faucet connecting with the heating-pipe.

4. A water-heater consisting of a U-shaped pipe, the upper ends of which extend into a reservoir, one of said ends projecting above the other, an inlet-pipe connecting with the shorter branch, and a discharge-cock with the longer branch, the thin mica casing surrounding the pipe, a single coil of high-resistance wire wound upon said insulating-covering with the turns out of contact with each other, clamps extending between the legs of the pipe, having one end to secure the ends of the coil against the mica and the other end extending to and clamped against, and insulated from, the opposite leg of the coil, and connections by which an electrical circuit through the wire is completed.

In witness whereof we have hereunto set our hands.

MILTON H. SHOENBERG.
HENRI LEVY.

Witnesses:
S. H. NOURSE,
CHAS. E. TOWNSEND.